US010963974B1

(12) United States Patent
Jump

(10) Patent No.: US 10,963,974 B1
(45) Date of Patent: *Mar. 30, 2021

(54) SYSTEMS AND METHODS FOR PREDICTING REGIONAL TURFGRASS PERFORMANCE

(71) Applicant: LAND O'LAKES, INC., Arden Hills, MN (US)

(72) Inventor: Bruce A. Jump, Grabill, IN (US)

(73) Assignee: LAND O'LAKES, INC., Arden Hills, MN (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/412,941

(22) Filed: May 15, 2019

Related U.S. Application Data

(63) Continuation of application No. 14/740,846, filed on Jun. 16, 2015, now Pat. No. 10,332,220, which is a continuation of application No. 13/645,647, filed on Oct. 5, 2012, now Pat. No. 9,087,022.

(51) Int. Cl.
  *G06Q 50/02* (2012.01)
  *A01G 20/00* (2018.01)
  *G06F 17/18* (2006.01)

(52) U.S. Cl.
  CPC .............. *G06Q 50/02* (2013.01); *A01G 20/00* (2018.02); *G06F 17/18* (2013.01)

(58) Field of Classification Search
  CPC .......... G06Q 50/02; A01G 20/00; G06F 17/18
  USPC ....................................................... 702/180
  See application file for complete search history.

(56) References Cited

U.S. PATENT DOCUMENTS

| 6,463,431 | B1 | 10/2002 | Schmitt | |
|---|---|---|---|---|
| 9,087,022 | B2 * | 7/2015 | Jump | ................. G06F 17/18 |
| 10,332,220 | B2 * | 6/2019 | Jump | ............. G06Q 10/06313 |
| 2006/0112123 | A1 * | 5/2006 | Clark | ................. G06F 40/18 |
| 2009/0106272 | A1 | 4/2009 | Jump et al. | |
| 2010/0192242 | A1 * | 7/2010 | Li | ....................... A01H 1/02 |
| | | | | 800/260 |

OTHER PUBLICATIONS

Web site "Calculating a weighted average using Excel functions", http://web.archive.org/web/20060924050200/http://www.meadinkent.co.uk!xlwtdavg.htm , snapshot of Sep. 24, 2006 downloaded from www.archive.org using the Wayback machine on Aug. 25, 2012.

(Continued)

*Primary Examiner* — Toan M Le
*Assistant Examiner* — Xiuqin Sun
(74) *Attorney, Agent, or Firm* — Dorsey & Whitney LLP

(57) ABSTRACT

Grass seed performance may be predicted by receiving grass seed selections for individual grass seed varieties and target geographic regions for growing the grass seed selection. A common set of grass attributes is identified from historical grass attribute values associated with the selected target regions. The historical grass attribute values in the first common set of grass attributes are retrieved and are displayed in a graphical format for the at least two individual grass seed varieties in the at least two selected target regions. A weighted average may be calculated for the historical grass attribute values in the common set and may provide a prediction of performance of the individual grass seed varieties across the selected geographic regions or in regions proximate the selected geographic regions.

14 Claims, 9 Drawing Sheets

(56) References Cited

OTHER PUBLICATIONS

"A Guide to NTEP Turfgrass Ratings" by Morris K. N., http://ntep.org/reports/ratings.htm, snapshot of Sep. 28, 2006 downloaded from www.archive.org using the Wayback machine on Jul. 19, 2011.

Hancock Seed Company Web site, http://www.hancockseed.com, snapshot of Oct. 29, 2006 downloaded from www.archive.org using the Wayback machine on Jul. 19, 2011.

Wherley, B.G. et al., "Low-input Performance of Zoysiagrass (*Zoysia* spp.) Cultivators Maintained under Dense Tree Shade", HortScience 46(7):1033-1037. Jul. 2011.

Patton, Aaron, Ph.D., "Selecting zoysiagrass cultivators: Turf quality and stress tolerance", Research GCM May 2010, pp. 90-95.

Yue, Chengyan et al., "User Preferences for Accessing Publically Available Turfgrass Cultivar Performance Data", Funded by Specialty Crop Research Initiative Competitive Grant of the USDA's National Institute of Food and Agriculture, Aug. 27, 2019, 12 pages.

\* cited by examiner

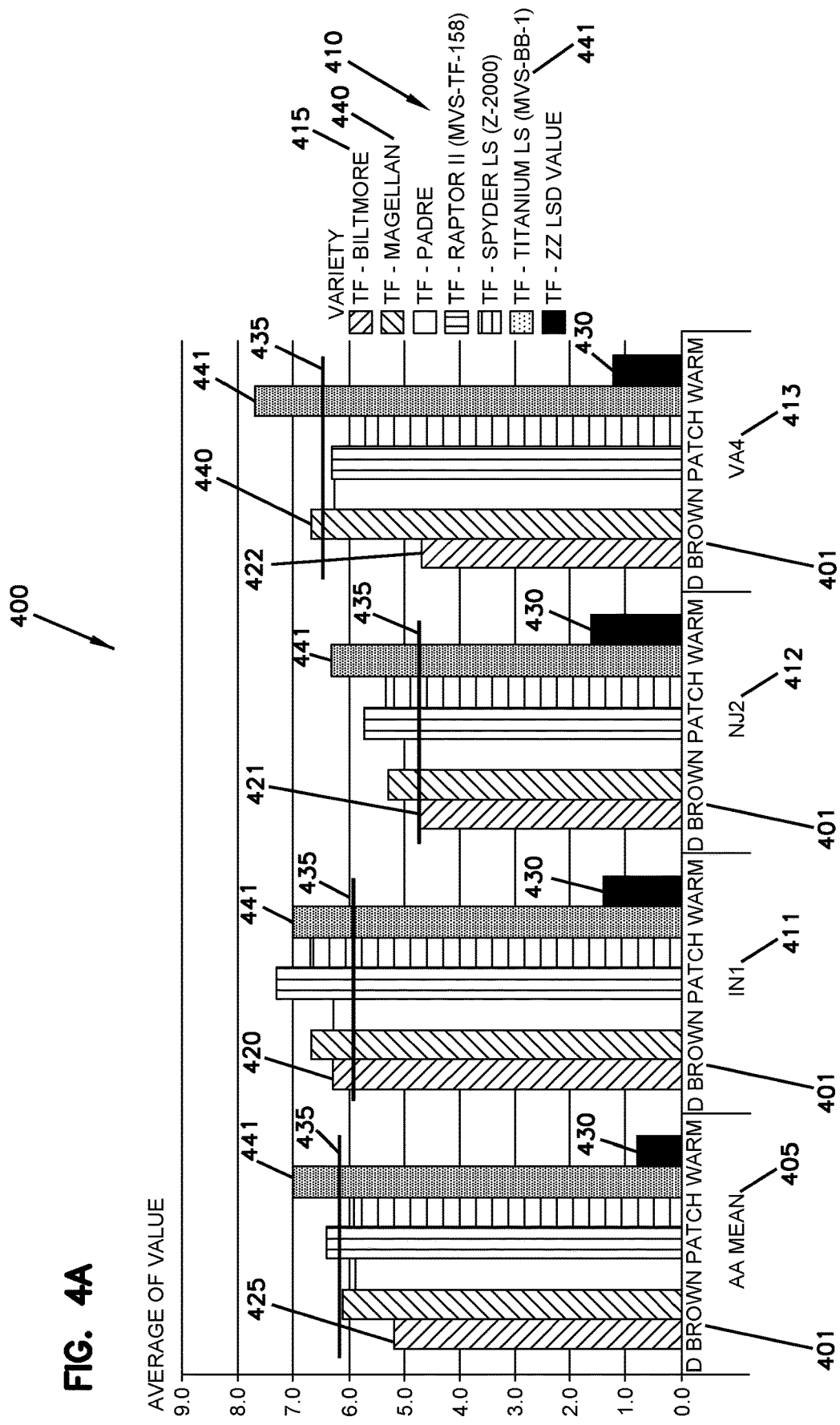

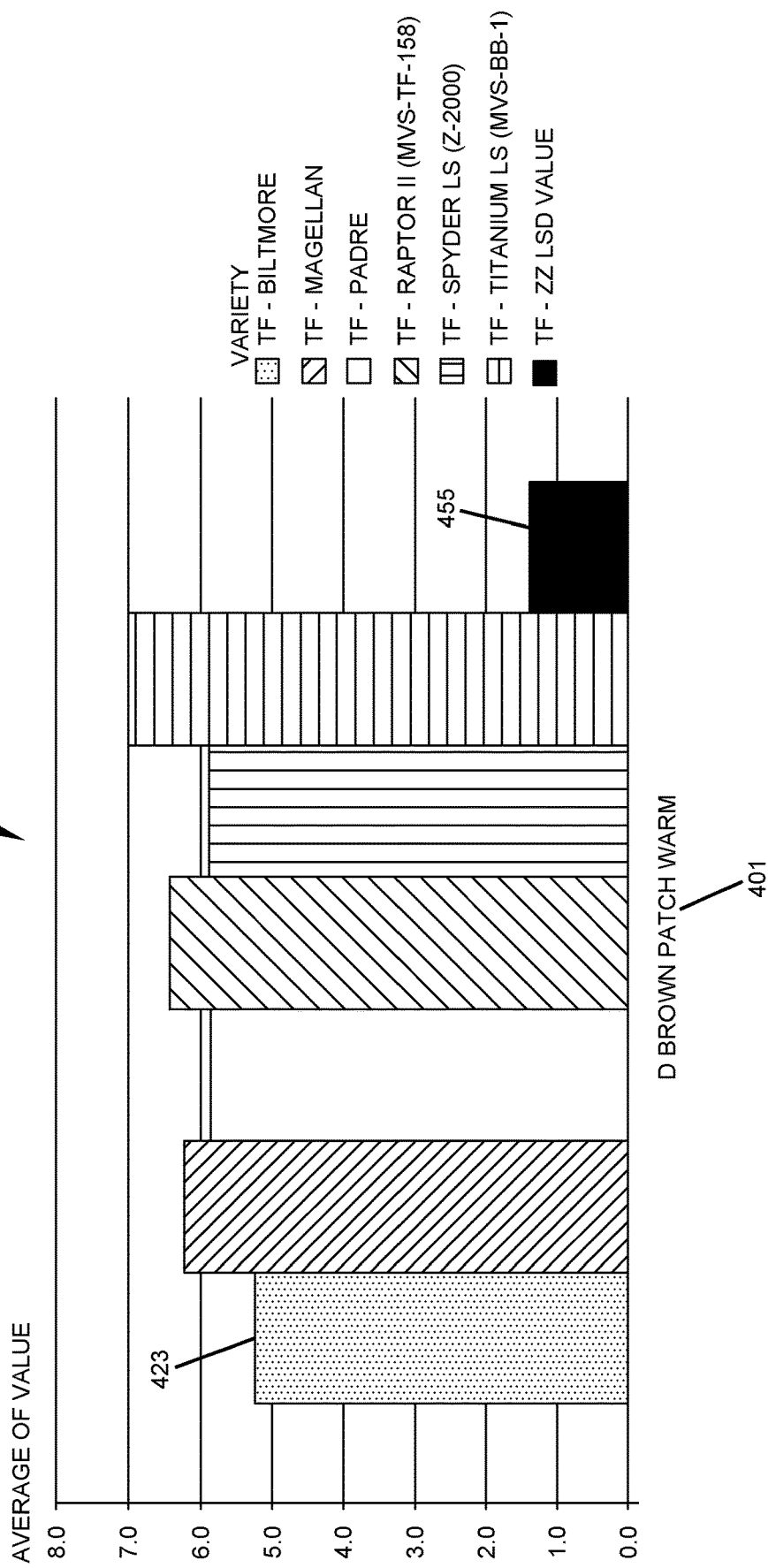

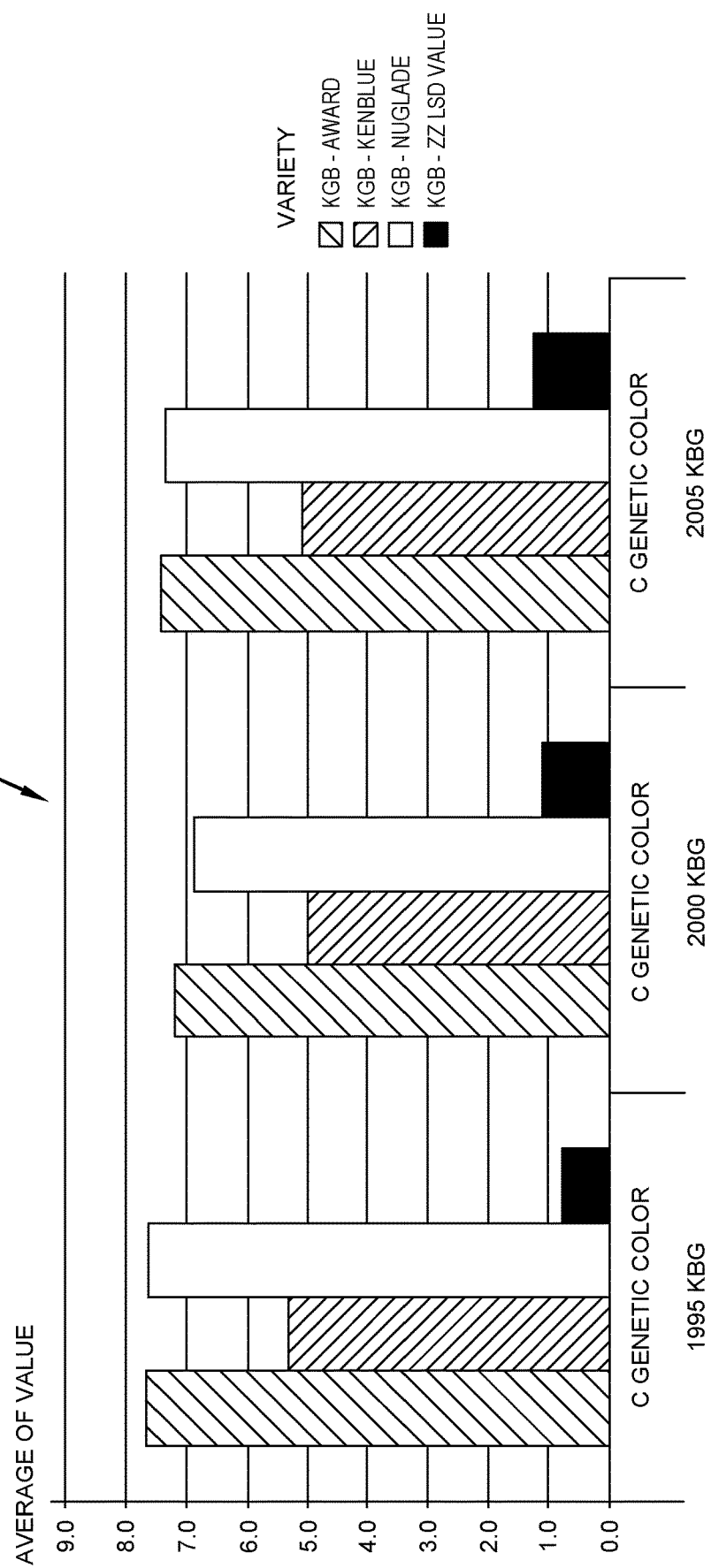

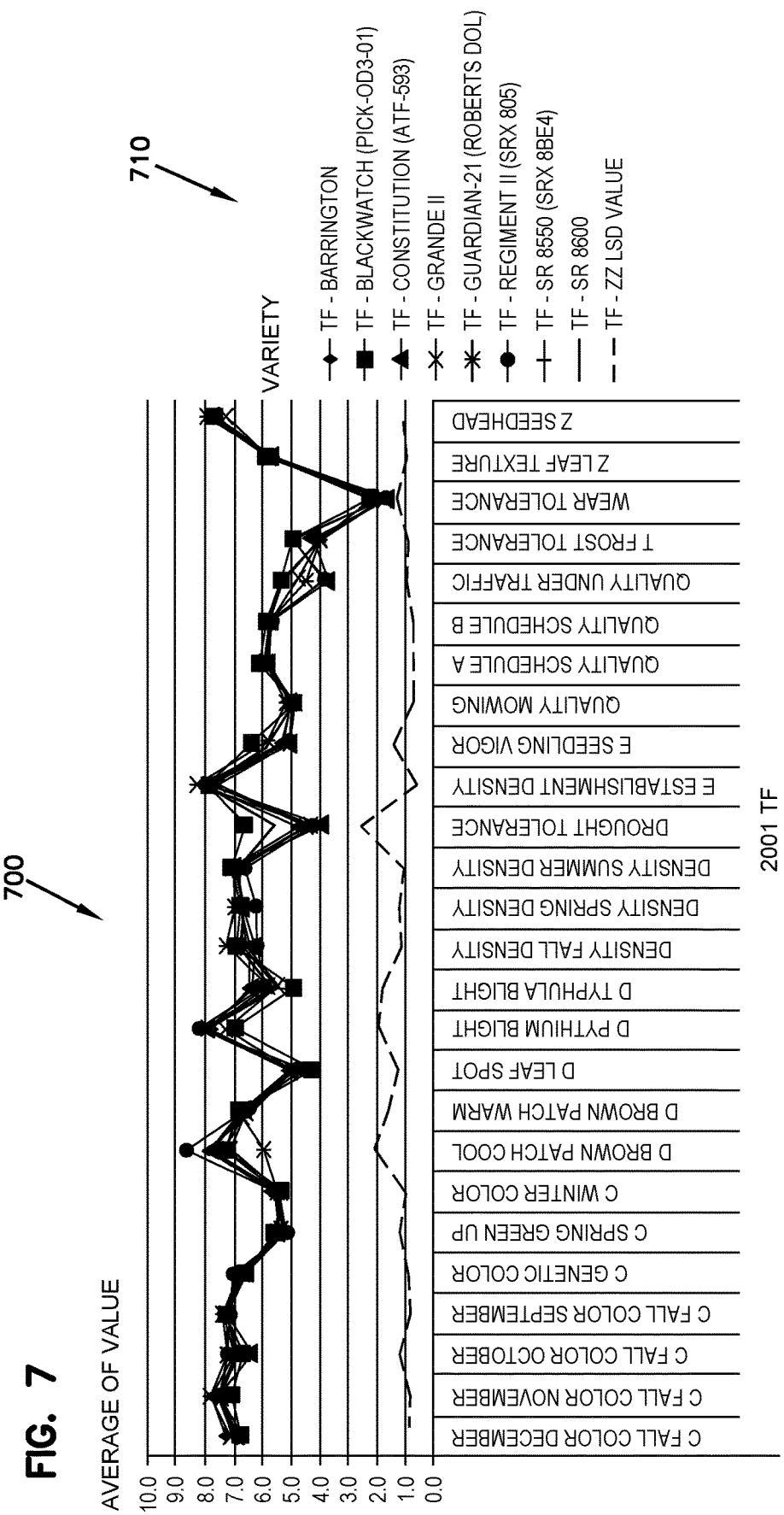

SYSTEMS AND METHODS FOR PREDICTING REGIONAL TURFGRASS PERFORMANCE

CROSS-REFERENCE TO RELATED APPLICATION(S)

This application is a continuation of U.S. Ser. No. 14/740,846 filed Jun. 16, 2015, issued as 10,332,220 on Jun. 25, 2019, which is a continuation of U.S. Ser. No. 13/645,647 filed Oct. 5, 2012, issued as U.S. Pat. No. 9,087,022 on Jul. 21, 2015, each of which is incorporated by reference herein, in the entirety and for all purposes.

FIELD OF THE INVENTION

Implementations are directed to systems and methods for predicting turfgrass performance based on a region in which the turfgrass is be grown.

BACKGROUND

There are many species of turfgrass seeds, and each species produces a grass that has unique characteristics or attributes. For example, some species can produce grasses that vary in color, leaf width, moisture requirements, and density (i.e., number of living plants in 1"×1" area).

The National Evaluation Turfgrass Program ("NTEP") evaluates turfgrass information such as turfgrass quality, color, density, resistance to diseases and insects, tolerance to heat, cold, drought and traffic. Evaluations are generally performed on turfgrass annually. However, evaluations are not necessarily conducted annually for each variety of turfgrass, and the aforementioned turfgrass information collected varies depending on the variety of turfgrass. In addition, for the same turfgrass variety, turfgrass evaluation information varies depending on the region in which the turfgrass is grown. Therefore, turfgrass information for one region or across regions may not be reflective of the actual performance of the turfgrass variety in another region.

In order for growers and consumers to purchase turfgrass seed or sod that meets their needs, turfgrass information is consulted. However, predicting performance within a particular region or across a number of regions can be difficult, on one hand, due to the large amount of information typically associated with a given turfgrass variety; and on the other hand, due to a lack of information for other turfgrass varieties that have not been evaluated in a region of interest. Furthermore, evaluating multiple attributes for various turfgrass varieties in a meaningful way is challenging due to the large amount of information associated with previously evaluated turfgrass varieties.

SUMMARY

Systems and methods herein may be used to predict performance of grass seed varieties within selected geographic regions as well as across geographic regions.

According to certain implementations, a computer-implemented method for predicting performance of grass seed varieties within geographic regions involves using a computer database to store a set of grass attributes and historical grass attribute values for a plurality of individual grass seed varieties. A number and a type of historical grass attribute values from the set of grass attributes differs among the plurality of individual grass seed varieties; and for the individual grass seed varieties, the historical grass attribute values includes a geographic region in which the grass seeds were grown. In addition, the historical grass attribute values for the plurality of individual grass seed varieties are associated with a plurality of geographic regions. A computer processor is used to receive a first grass seed selection of at least two individual grass seed varieties and at least two target geographic regions for growing the first grass seed selection. A first common set of grass attributes is identified by the processor from the historical grass attribute values for the selected target regions from the differing number and type of historical grass attributes stored in the database. Using the processor, the historical grass attribute values in the first common set of grass attributes are retrieved, and the common set of retrieved historical grass attribute values is displayed in a graphical format as a prediction of performance of the individual grass seed varieties within the individual regions.

In further implementations, a computer processor communicatively coupled to the computer database is configured to receive a first grass seed selection of at least two individual grass seed varieties, at least two historical growing years, and at least two target geographic regions for growing the first grass seed selection. Based on the selection, the processor identifies a common grass attribute from the historical grass attribute values for the selected target regions for each of the historical growing years and retrieves the historical grass attribute values for the common grass attribute. The processor transmits to a display the retrieved historical grass attribute values for the identified common grass attribute in a graphical format, which may be used as a prediction of attribute performance of the individual grass seed varieties within the individual regions.

In yet further implementations, a computer processor is configured to receive a first selection of at least two grass seeds and at least two target geographic regions for growing the grass seed selection. The target geographic regions selected are proximate a third geographic region. A first common set of grass attributes is identified by the processor from the historical grass attribute values for the selected target regions and the historical grass attribute values for the common grass attribute are retrieved. Based on the retrieved attributes, a first weighted average in the common set for each of the retrieved historical grass attribute values across the selected regions is calculated and is displayed in a graphical format, which may be used as a prediction of performance of the individual grass seed varieties in the third geographic region.

BRIEF DESCRIPTION OF THE DRAWINGS

FIGS. 3-7 illustrate a graphical output of predictions of regional turfgrass performance according to certain implementations.

DETAILED DESCRIPTION

Implementations provide systems and methods for predicting performance of grass seed varieties within selected geographic regions as well as across geographic regions. When the same grass seed variety is planted in two or more geographic regions, grass seed performance can vary. Accordingly, aspects of the present disclosure may be particularly useful for purchasers and growers of turfgrass in making purchasing and planting decisions because the implementations provide means for predicting grass seed performance across a number of regions. This may provide an understanding of whether the same grass seed or seed mixture can be planted in multiple selected regions while achieving a desired performance.

Systems and methods use information for grass seed attributes for grass seed varieties previously planted in order to predict performance of selected grass seeds in selected regions. For example, for a particular grass seed variety that may potentially be planted in Iowa and Illinois, systems and methods enable users to review historical grass seed attributes for the grass seed variety previously planted and evaluated in Iowa and Illinois, when available. For attributes not previously evaluated for the variety within Iowa or Illinois, then one or more regions proximate the region of interest may be selected for evaluation and comparison.

Figure 1:
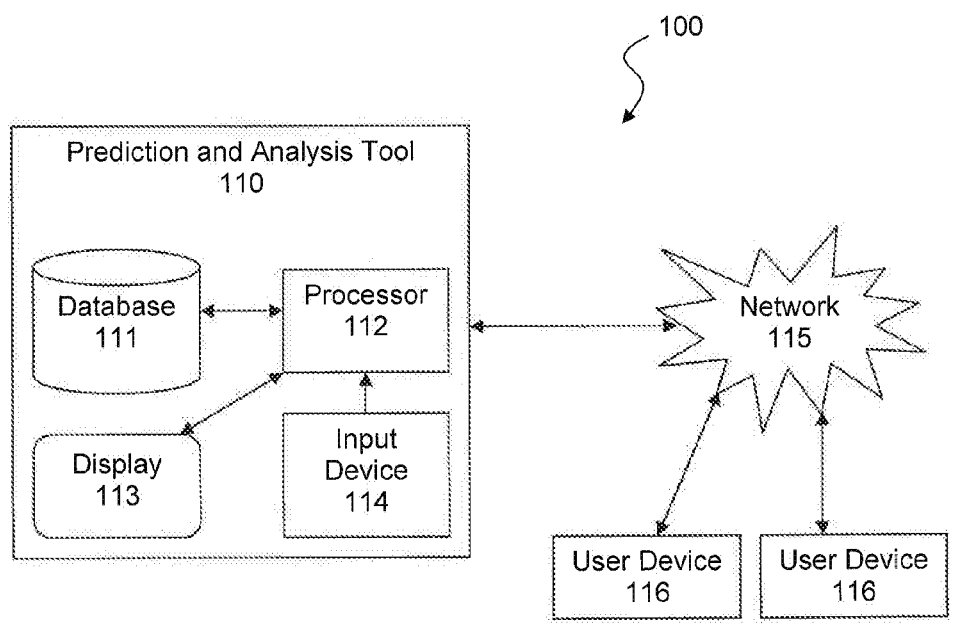
FIG. 1 is a block diagram of a computer system for predicting regional turfgrass performance according to certain implementations.

FIG. 1 is a block diagram of a computer system 100 for predicting geographic turfgrass performance, according to certain implementations. The system 100 includes a prediction and analysis tool 110 with a database 111, a processor 112, a display 113 and an input device 114 (e.g. a keyboard or remote control). In some implementations, the prediction and analysis tool 110 may be one or more general purpose computers, special purpose computers or both.

The database 111 is configured to store the information required to predict performance of grass seed varieties according to a geography in which the varieties are to be planted. The information stored may include grass seed identification information for a number of grass seed varieties, a set of grass attributes, and historical grass attribute values (e.g., numerical values, grades and rankings) for the individual grass seed varieties planted in various geographic locations.

Grass seed identification information for the grass seed varieties may include the identification of particular types of grass species such as Kentucky bluegrass and tall fescue, as well as particular varieties of grass seeds such as the Kentucky bluegrass varieties Award, Granite, Nu destiny, Nuglade, SR 2100, SR 2284, and Touche; and the tall fescue varieties Biltmore, Magellan, Padre, Raptor II, Spyder LS, and Titanium LS. In addition, the database 111 may store information related to grass species or variety such as the location tested (e.g., within a state), the year tested, variety name, species name, manufacturer. Further, information related to availability and pricing of the grass species or varieties generally, as well as price and availability within particular regions, may be included in the grass seed identification information.

The set of grass seed attributes stored in the database 111 may include a number of grass attributes. For example, the attributes may include some or all of the species characteristic information reported by the NTEP, as well as characteristic information submitted by particular growers. These attributes may include, but are not limited to: aggressiveness, brown patch, cold tolerance, color, compaction tolerance, dollar spot, drought tolerance, early spring green up, endophyte/insect resistance, fast establishment, height/mowing frequency, insect tolerance, leaf spot, leaf texture, low maintenance, low mowing height, mountain west quality, mowing quality, necrotic ring spot, Pacific Northwest quality, quality ratings, red thread, rhizomatous, crown and stem rust, salt tolerance, shade tolerance, shade/powdery mildew, sod-shear strength, summer patch, summer stress, and wear tolerance.

The historical grass attribute value information for grass species or variety stored by database 111 includes values such as rankings or NTEP values for individual grass attributes, a geographic region in which the grass seed was planted, and the year in which the grass seed was grown. Geographic regions may be a region within a country (e.g., Midwest), by state or the like, by region within a state (e.g., IL1 and IL2), by county, or according to a specified area in which the turfgrass was grown (e.g., a valley within Southern Illinois). Historical grass attribute values typically are available only for a limited number of attributes within the set of grass attributes. In some cases, this is because evaluation of the attribute was not conducted within a particular region for a particular year or the attribute is not relevant to the grass seed, for example due to lack of data associated with the attribute such as when environmental conditions were not favorable for the expression of an attribute to be tested (e.g., brown patch disease data may not be collected due to cold weather and drought tolerance data may not be available due to heavy rains, etc). Accordingly, the historical attribute values for the individual grass seed varieties stored in the database 111 typically are for a portion of the set of grass seed attributes described above. In addition, it will be understood that the database 111 may store historical grass attribute values for grass seed varieties for multiple geographic regions, and the values may vary from region to region.

The processor 112 of the prediction and analysis tool 110 is configured to execute operations for predicting geographic performance of turf grass described herein. In addition, the processor 112 is configured to execute instructions for receiving, retrieving and updating grass information stored in the database 111. For example, the processor 112 and the database 111 may be periodically updated with grass identification information, with an updated set of grass attributes, and with historical grass attribute values for individual grass seed species or varieties. The processor 112 may also be configured to transmit content to the display 113 such as grass seed values, grass seed listings, values, graphs, and user selections. Further, the processor 112 is communicatively coupled to the input device 114 and is configured to receive input such as user selections. The display 113 may be a conventional display device such as a computer monitor, and the input device 114 may be a conventional keyboard or a remote control.

While the prediction and analysis tool 110 of system 100 may be used for predicting geographic performance of turfgrass, in some implementations the system 100 may be communicatively coupled to a communications network 115 for enabling a number of user devices 116 to enter user input and receive information on the predicted geographic performance of turfgrass from the system 100. The user devices may be configured as one or more general purpose computers, special purpose computers or both.

Figure 2:
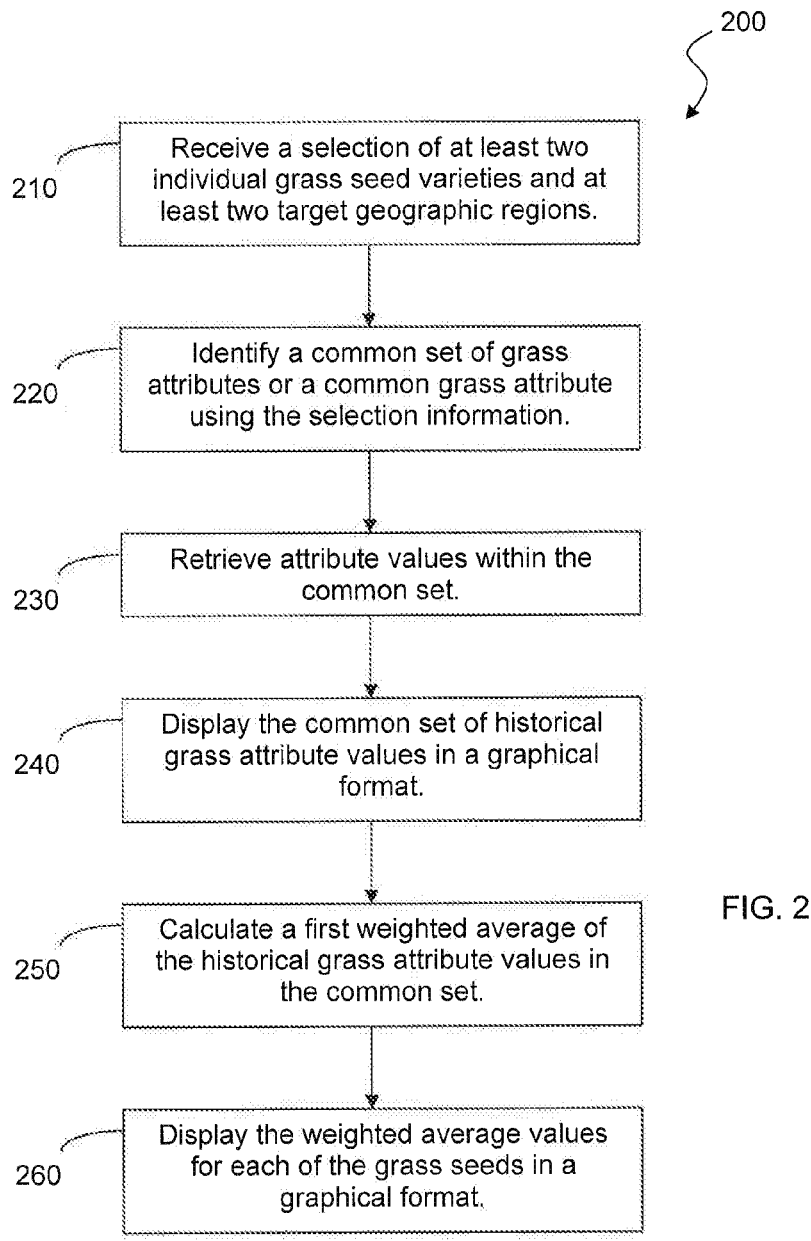
FIG. 2 is a flow chart of a method for predicting regional turfgrass performance according to certain implementations.

FIG. 2 illustrates a method 200 of using the system 100 for predicting geographic performance of grass seed varieties in which the processor 112 executes instructions for performing the operations therein. In operation 210, selections are received for one or more of grass seed varieties as well as the variety or varieties target geographic regions, historical growing year, particular attributes of interest, and so on. In FIG. 2, operation 210 involves receiving a selection of at least two individual grass seed varieties. For example, a user may select two or more Kentucky bluegrass species (e.g., Award 301, Nuglade 302 and SR 2100 303, see FIG. 3), but it will be understood that the selection may include several grass seed varieties. In addition, in operation 210, selections of at least two target geographic regions for growing the grass seed selection may be received. For example, the geographic selection may be of regions within a state (e.g., IA1 (Iowa 1) 305; IA2 306 (Iowa 2); IL1 (Illinois 1) 307 and IL2 (Illinois 2) 308, see FIG. 3) where each region selected represents a different geographic area.

In some implementations, selecting a grass seed variety in operation 210 results in identifying an available selection of geographies in which information is available for the selected grass seeds. Alternatively, where a geographic selection is initially received, an available selection of grass seed varieties for the selected geography may be identified. Further, in some implementations, operation 210 involves receiving a selection of one or more historical growing years (e.g., 1995). In this case, the available selections of one or both of geographies and grass seed varieties based on the selected year or years may be identified. Subsequent to receiving a selection from the available options, the remaining available selections of the geographies or the grass seed varieties available for selection by the user may be identified. Receipt of the grass seed varieties, geographies and historical growing year(s) may be in any order, and it will be understood that upon receipt of the one or more selections, the processor 112 may initiate the identification processes to reduce the available options for subsequent selection, when applicable, and display such options for user selection.

Figure 3:
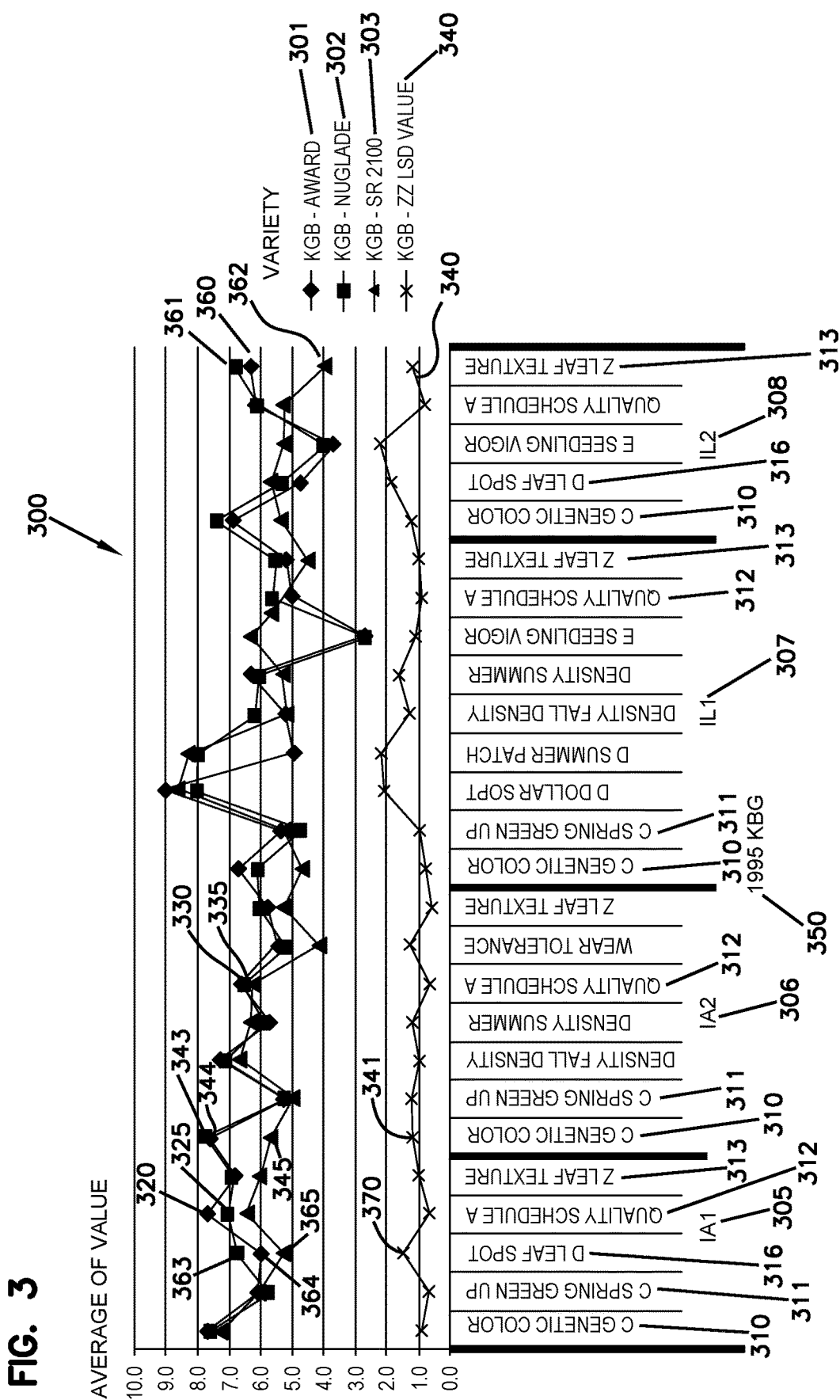

Upon receipt of the selections, operation 220 proceeds by identifying a common set of grass attributes using the selection information. By querying the historical grass attribute values for the selected grass seeds within the selected target regions, grass seed attributes in common to the selected grass seeds are identified to form a common set of attributes. Typically, the common set of attributes includes at least two attributes. However, in some cases the common set may include one common attribute. Turning to FIG. 3, for example, the selection of Award 301 and Nuglade 302 in Iowa 1 305 and in Iowa 2 306, the common attributes of "Genetic Color" 310, "Spring Green Up" 311, "Quality Schedule A" 312, and "Z Leaf Texture" 313 are identified by the processor as a common set of attributes. In FIG. 4, the common attribute for the grass seed varieties is "Brown Patch Warm" 401. Further, when more than two target regions are selected, the processor identifies a common set of attributes among at least two of the target regions. In FIG. 3, for example, the selection of Award 301 and Nuglade 302 in Iowa 1 305 and Illinois 2 306, the common attributers of "Genetic Color" 310, "Leaf Spot" 316, "Quality Schedule A" 312 and "Z Leaf Texture" 313 are retrieved by the processor. When more than two individual grass seed varieties are selected, the processor 112 preferably identifies the common set of attributes among each of the selected grass seed varieties. However, the common set may be identified among two or more of the selected grass seed varieties.

Identification of the common set of attributes enables operation 230 to proceed in which attribute values within the common set are identified and retrieved from the differing number and type of historical grass attributes stored in the database 111 associated with the selection. For example, in FIG. 3 for the "Quality Schedule A" 312 attribute in Iowa 1 305, Award 301 has a retrieved value of about 7.8 320 and Nuglade 302 has a retrieved value of about 7.0 325; and in Iowa 2 306, Award 301 and Nuglade 302 each have a retrieved value of about 6.6 330,335. As discussed above, the common set of attributes is identified according to the implementations herein in order to provide meaningful comparisons between the grass seed variety selections. This differs from prior approaches in which all attributes typically for a single grass seed variety is provided.

In operation 240, the common set of historical grass attribute values is caused to be displayed in a graphical format for the at least two individual grass seed varieties in the at least two selected target regions. In some implementations, the attribute values may be displayed as a numerical value in addition or as an alternative to the graphical display.

In some implementations, the method may further involve calculating a first weighted average of the historical grass attribute values in the common set in operation 250. Using FIG. 4A as an example, for the attribute "Brown Patch Warm" 401, the weighted average is identified as "AA Mean" 405 and is displayed on the left side. In some implementations, the weighted average values are displayed for each of the six grass seed varieties 410. In this example, the weighted average may be calculated by using the attribute values for each individual grass seed variety within each of the regions selected. In FIG. 4B, the three regions selected include IN1 (Indiana 1) 411, NJ2 (New Jersey 2) 412, and VA4 (Virginia 4) 413. Using the tall fescue grass seed variety Biltmore 415 as an example, and referring to FIG. 4A, the Indiana 1 value of 6.4 420 is added to the New Jersey 2 value of 4.6 421 and to the Virginia 4 value of 4.6 422 and then divided by 3 to yield a weighted average of 5.2 ((6.4+4.6+4.6)/3=5.2), and in FIG. 4B, the "AA Mean" for Biltmore is displayed as 5.2 423 described below. The weighted average may be calculated in a substantially similar way for each of the six varieties displayed. In further implementation, the weighted average values may be displayed for all grass seed varieties across all regions. In this example, the attribute values for the individual grass seed variety across all available regions are used to calculate the weighted average.

Upon calculating the weighted average, the processor may display the weighted average values for each of the grass seeds in a graphical format in operation 260. In FIG. 4A, the display 400 is a bar chart, but it will be understood that other graphical formats may also be used. In some implementations, the weighted average may be displayed as a numerical value in addition or as an alternative to the graphical display. Providing the weighted average on the display may give the user information useful for predicting grass seed performance across the selected geographic regions, across all regions or both. In some implementations, the weighted average may be displayed together with the historical grass attribute values in the graphical format, such as shown in FIG. 4A for the "Brown Patch Warm" 401 attribute. In further implementations, the weighted average may be displayed separately from the historical grass attribute values.

In some implementations, attribute value and weighted average value information displayed in operations 240 and 260 may be accompanied by a statistical benchmark. In some implementations the benchmark may be a graphical indicator of statistically significant differences in the grass attribute values among the individual grass seed varieties. For example, in FIG. 3, each attribute includes a least significant differences ("LSD") value 340 indicating that a value difference between the grass seed varieties value exceeds the LSD value is statistically significant. For example, in FIG. 3, the "genetic color" 310 attribute in the Iowa 2 (IA2) 306 region has a LSD value of 1.1 341, and for the SR 2100 variety 303 compared to the Award 301 and Nuglade 302 varieties, there was a statistically significant difference because the variation between attribute values exceeds 1.1 (e.g., the Award and KBG values of 7.8 343, 344 compared to the SR 2100 value of 5.8 345 is 2.0). In addition or alternatively, the benchmark may be provided as numerical value for each of the grass attributes.

In further implementations, a selected growing year may be used as input in the method 200 for predicting geographic performance of grass seed varieties. In this case, operation 220 involves identifying the common set of historical grass attributes further based on a selected growing year received in operation 210. In operation 230, a common grass attribute may be identified based on the historical growing year and the historical grass attribute values for the selected grass seed variety in the target regions from the selected growing year. The historical grass attribute values for the common grass attribute may be retrieved in operation 230, and the retrieved historical grass attribute values for the identified common grass attribute may be displayed in a graphical format for each of the at least two selected target regions and for the historical growing years. In addition, the display may identify the historical growing year as shown in FIG. 3, e.g., the 1995 growing year 350.

In yet further implementations, a first and a second weighted average may be calculated for separate selections of target regions or separate selections of grass seed varieties. Selecting various sets of target regions may enable a user to understand the predicted performance of differing grass seed varieties across different target regions. For example, a second selection of at least two target regions for the at least two grass seed varieties may include a geographic selection proximate one of target regions from the first selection. With reference to FIG. 3, a first selection may include Iowa 1 305 and Iowa 2 306, and the second selection may include Iowa 2 306 and Illinois 1 307. In this example a second common set of grass attributes may be identified by the processor 112 querying the stored historical grass attribute values for the selected target regions. In some implementations, the common sets of grass attributes overlap or are the same. A second weighted average may be calculated for each of the historical grass attribute values in the second common set based on the second selection. The second weighted average for the historical grass attribute values may be displayed as a set of values and/or in a graphical format with the first weighted average as predictions of grass seed performance across the target regions in the second selection. Further, the weighted average for all available regions may be calculated and displayed adjacent to the aforementioned first and second weighted averages.

Selecting various individual grass seed varieties for comparison may enable a user to understand the predicted performance of the varieties across a common selection of target regions. For example, a second selection of at least two grass seeds for the target regions in the first selection may be received, and the varieties of the second selection at least partially differ from the first selection. Here a second common set of grass attributes is identified from the historical grass attribute values in the selected target regions. As above, the common sets of grass attributes may overlap or are the same. A second weighted average is calculated for each of the historical grass attribute values in the second common set based on the second selection. As above, the second weighted average may be displayed as one or more of a set of values, in a graphical format and as a combination in order to provide predictions of grass seed performance across various selections of individual grass seed varieties across the same set of selected target regions.

FIG. 3 provides a graphical display 300 of historical grass attribute values for a variety of attributes using three Kentucky bluegrass varieties 301-303 across four regions 305-308 in the 1995 growing year 350. In FIG. 3, for each of the three varieties 301-303, historical grass attribute values are provided for each attribute listed in each region 360-362. For example, for the "Leaf Spot" 316 attribute in IA1 (Iowa 1) 305, the corresponding attribute values for Nuglade 302 is 7.0 363, for Award 301 is 6.2 364, and for SR2100 is 5.4 365. FIG. 3 additionally provides the LSD value 340 as a benchmark value indicating the degree of difference between attribute values indicative of a statistically significant difference between varieties. In this example, the "Leaf Spot" 316 attribute benchmark value is 1.5 370, and the largest difference between varieties is 1.6 (e.g., the difference between the Nuglade attribute value of 7.0 363 compared to the SR 2100 value of 5.4 is 1.6), meaning difference in the performance of the varieties statistically differed indicative of a statistically better performance of Nuglade compared to SR 2100 for "Leaf Spot" 316. In contrast, for the "Genetic Color" 310 attribute in IA1 305, the corresponding attribute values for the varieties 301-303 are range within about 0.6, e.g., between about 7.2 and 7.8, and the benchmark value for this attribute is 1.0, meaning the difference between the varieties 301-303 for the "Genetic Color" 310 attribute are not statistically significant. Although FIG. 3 illustrates a graphical line display of the historical grass attribute values, this information may be displayed in a variety of formats including numerical formats, bar charts and so on.

FIG. 4A provides a graphical display 400 of historical grass attribute values for the attribute "Brown Patch Warm" 401 using six tall fescue varieties 410 across three regions 411-413 and a weighted average for the attribute according to each variety across all available regions ("AA Mean" 405). In FIG. 4A, for each of the six varieties 410, the historical grass attribute value is provided for the single attribute "Brown Patch" 401. This display 400 may be useful when a particular attribute is of interest for grass seed varieties within particular regions and across all available regions, which may include more regions that the three provided in FIG. 4A. As shown on the left side of FIG. 4A, the weighted average for this attribute across all regions for the Biltmore variety 415 is 5.33 425, which is calculated by taking the mean of the attribute values for the Biltmore variety for each available region. In this example, more regions than the three shown in FIG. 4A are available, which provides a weighted average that is higher than the weighted for the three regions alone. In addition, FIG. 4A illustrates two benchmarks, one as a bar 430 on the right side of each region section 411-413 and in the "AA Mean" section 405, and a second as a line 435 extending across the graph in an area corresponding to each region 411-413 section and in the "AA Mean" section 405. The regional benchmarks are similar to those described above, and the "AA Mean" benchmarks are calculated using the mean of the benchmarks for all available regions, which may include more regions than those displayed in FIG. 4A. Within the individual regions, there was no statistical difference between the varieties in IN1 411 and NJ2 412, and the Magellan 440 and Titanium LS 441 varieties had the best performance in VA4 413. Overall, the Titanium 441 variety showed the best performance across all regions shown (e.g., 411-413) and all regions for which data is available for Titanium 441 (e.g., 405).

FIG. 4B provides a graphical display 450 of historical grass attribute values for the same "Brown Patch Warm" 401 attribute across the above-identified three regions, e.g., IN1 411, NJ2 412 and VA4 413. For example, as shown in FIG. 4A, the "Brown Patch Warm" 401 attribute value for the Biltmore 415 variety in IN1 (Indiana 1) is 6.4, in NJ2 (New Jersey 2) is 4.6, and in VA4 (Virginia 4) is 4.6; and the weighted average for the Biltmore variety across the three regions is 5.2 423 (e.g., (6.4+4.6+4.6)/3=5.2). The benchmark 455 illustrated in FIG. 4B corresponds to the mean of the benchmark value for the three regions 411-413 shown in FIG. 4A.

Figure 5:
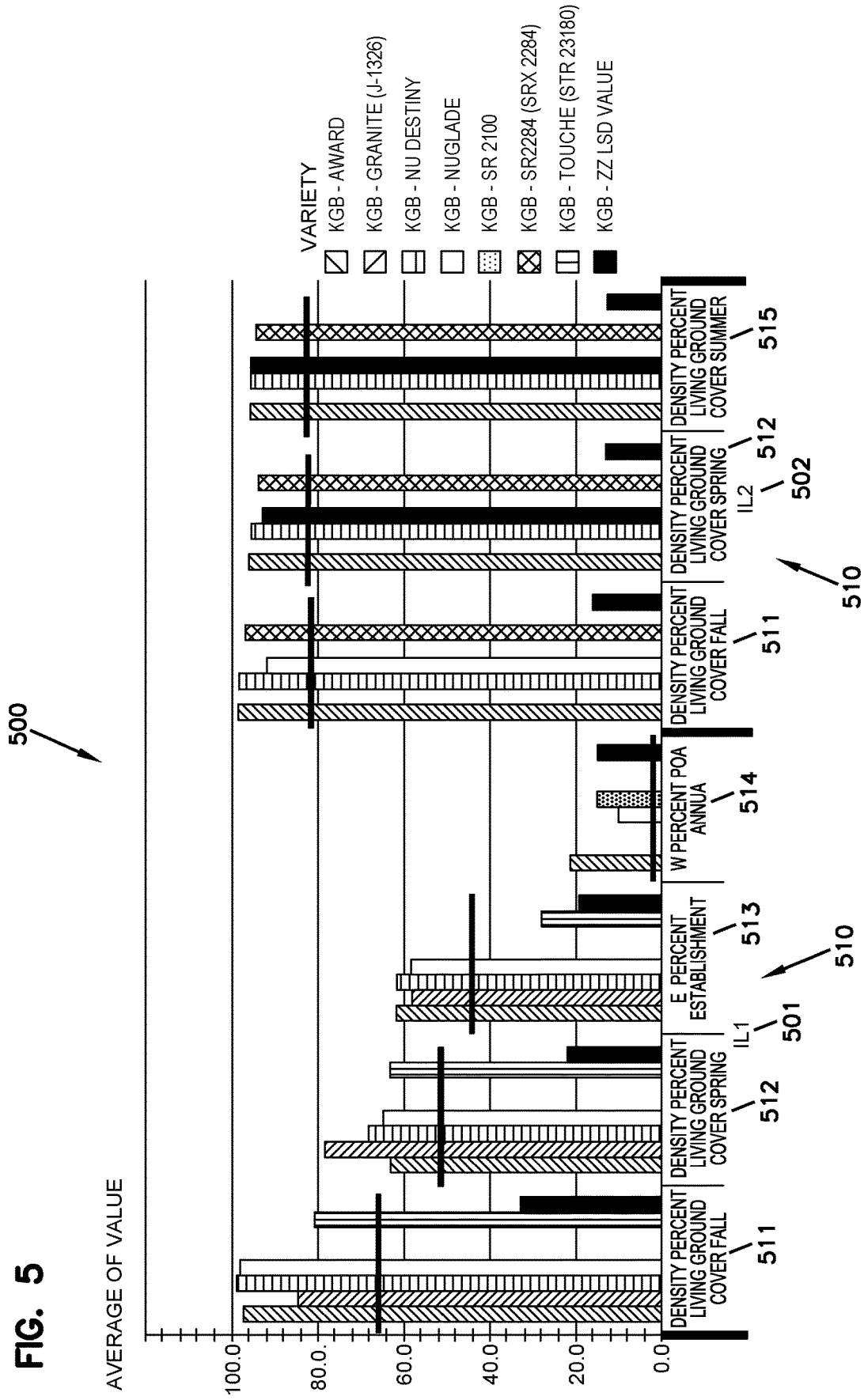

FIG. 5 provides a graphical display 500 illustrating a themed approach to providing historical grass attribute values. In this themed approach, a group of different attributes are to be associated with a particular theme, and the historical grass attribute values for the various attributes in the group, when available, may be provided for analysis and review across different regions such as IL1 501 and IL2 502. In FIG. 5, the theme shown is the "Percent living ground cover" 510 for seven Kentucky bluegrass varieties across two regions. In this approach, the "Percent living ground cover" 510 theme is represented by a collection of attributes including "Density percent ground cover fall" 511, "Density percent ground cover spring" 512, "percent establishment" 513, "percent POA annua" 514, and "Density percent ground cover summer" 515. However, the "Percent Establishment" 513, "Percent POA Annua" 514 and the "Density Percent Living Ground Cover Summer" 515 are only available for one region. Because each of the attributes relate to the "Percent living ground cover" 510 theme, where available, these attributes may be displayed. In FIG. 5, the Touche 520 variety underperformed in the attribute "Percent Establishment" 513.

In some implementations, a common set of attributes within the theme in a common location may be displayed, as shown in FIG. 5 by the display of the "Density Percent Living Ground Cover Fall" 511 and "Density Percent Living Ground Cover Spring" 512 attributes on the left side of each region IL1 501 and IL2 501. Further, a weighted average may be calculated for the common set of attributes for the selected regions, across all available regions, or both. In addition, other themes may be selected by the user, such as a "Disease pressure" theme, and in response, a group of individual attributes that have commonalities to disease pressures may be identified and the attribute values displayed.

Figure 6A:
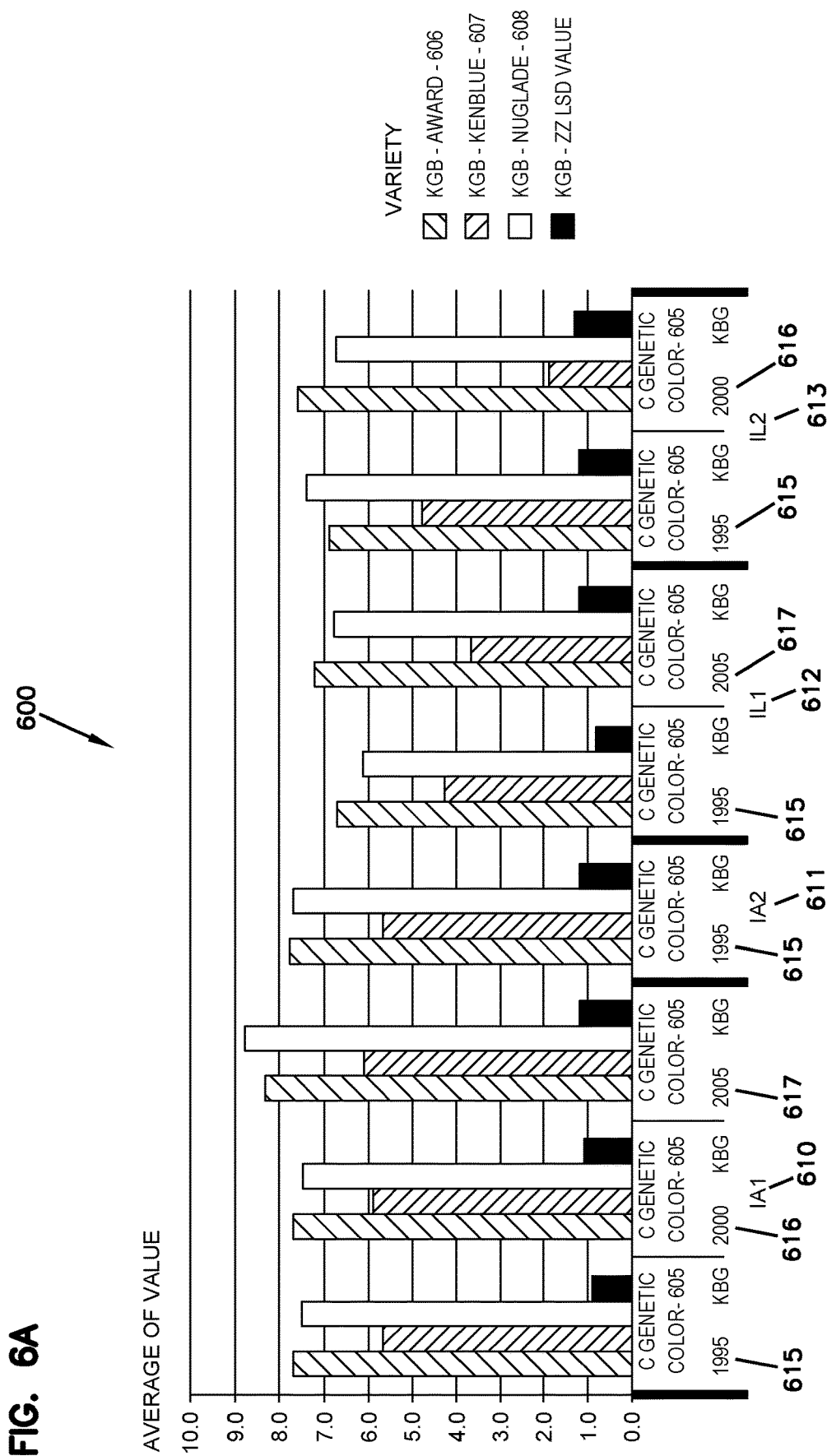

FIG. 6A provides a graphical display 600 illustrating historical grass attribute values for the "Genetic Color" 605 attribute using three Kentucky bluegrass varieties 606-608 across four regions 610-613 for three growing years 615-617. As shown in FIG. 6A, the Kenblue 607 variety underperformed in this attribute for all regions across all growing years. In addition, as shown, the display provides a comparison of various growing years within each region. For example, in IA1 (Iowa 1) 610, attribute values for three growing years, 1995 615, 2000 616 and 2005 617 are displayed. This allows a user to understand how the same varieties performed within the same region across different years. Further, FIG. 6A illustrates attribute values for the same growing year across multiple regions. For example, for the growing year 1995 615, attribute values are available within each of the four regions, IA1 610, IA2 611, IL1 612 and IL2 613. This allows a user to understand how the same varieties performed across different regions for the same year.

FIG. 6B provides a graphical display 650 of the weighted average across the available four growing regions 610-613 for each growing year that may be generated by system 100. For example, for the growing year 1995 615, the weighted average is calculated by determining the mean of the attribute values for each of the varieties for each of the four growing regions 610-613; while for the growing year 2000 616, the weighted average is calculated by the processor 112 determining the mean of the attribute values for the available IA1 610 and IL2 613 growing regions; and for the 2005 617 growing year, the processor 112 determines the mean of the attribute values for the available IA1 610 and IL1 612 growing regions.

FIG. 7 provides a graphical display 700 of the weighted average across all growing regions for eight tall fescue varieties 710 for the 2001 growing year that may be generated by system 100. As described above, the mean of the attribute values for each of the varieties may be calculated for all available growing regions during the 2001 growing year, and the mean attribute value for each attribute of the variety may be displayed. FIG. 7 provides a user with a snapshot view of the overall performance of the individual grass seed varieties and may be useful for comparison with narrower geographic selections, for comparison with other grass species, or for comparison with other growing years.

This application hereby incorporates by reference in its entirety U.S. application Ser. No. 11/876,022, filed Oct. 22, 2007, entitled "Methods and Tools for Evaluating a Mixture of Turfgrass Seeds."

In the present disclosure, the methods disclosed may be implemented as sets of instructions or software readable by a device. Further, the specific order or hierarchy of steps in the methods disclosed are examples of sample approaches and the specific order or hierarchy of steps in the method can be rearranged while remaining within the disclosed subject matter. The accompanying method claims present elements of the various steps in a sample order, and are not necessarily meant to be limited to the specific order or hierarchy presented.

The present disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter. The form described is merely explanatory, and it is the intention of the following claims to encompass and include such changes.

While the present disclosure has been described with reference to various embodiments, it will be understood that these embodiments are illustrative and that the scope of the disclosure is not limited to them. These and other variations, modifications, additions, and improvements may fall within the scope of the disclosure as defined in the claims that follow.

What is claimed is:

1. A computer-implemented method for predicting performance of seed varieties, the method comprising:

using a computer database to store a set of historical performance data for each of a plurality of individual seed varieties, the sets of historical performance data each comprising at least an identity of the individual seed variety, a historical growing year, attributes of the seed varieties and attribute values of the seed varieties; and using a computer processor to:
receive a selection of a plurality of individual seed varieties;
receive a themed selection, the themed selection representing a group of attributes having commonalities;
identify a common set of attributes from the themed selection using the selected plurality of individual seed varieties;
calculate a weighted average for each attribute value for the selected individual seed varieties; and
display on a visual interface representations of attribute values for the common set of attributes as identified from the stored data for the selection of the plurality of individual seed varieties as a prediction of performance of the individual seed varieties, wherein the representations include a comparison of the common set of attributes for the selected individual seed varieties, and wherein the representations include the weighted average of each historical attribute value.

2. The method of claim 1, wherein the themed selection is a disease pressure theme.

3. The method of claim 1, wherein a number of attributes or the attribute values differ among the sets of historical performance data.

4. The method of claim 1, wherein the selections of the plurality of individual seed varieties is by historical growing year, and wherein the processor is used to identify the common set of historical attributes for the historical growing year.

5. The method of claim 1, wherein the attributes comprise National Turf Evaluation Program (NTEP) attributes.

6. A computer-implemented method for predicting performance of seed varieties, the method comprising:
using a computer database to store a set of historical performance data for each of a plurality of individual seed varieties, the sets of historical performance data each comprising at least an identity of the individual seed variety, a historical growing year, attributes of the seed varieties and attribute values of the seed varieties; and using a computer processor to:
receive a selection of a plurality of individual seed varieties;
receive a themed selection, the themed selection representing a group of attributes having commonalities;
identify a common set of attributes from the themed selection using the selected plurality of individual seed varieties;
calculate a ranking for each attribute value for the selected individual seed varieties; and
display on a visual interface representations of attribute values for the common set of attributes as identified from the stored data for the selection of the plurality of individual seed varieties as a prediction of performance of the individual seed varieties, wherein the representations include a comparison of the common set of attributes for the selected individual seed varieties, and wherein the representations includes the ranking of each historical attribute value.

7. The method of claim 6, wherein the themed selection is a disease pressure theme.

8. The method of claim 6, wherein a number of attributes or the attribute values differ among the sets of historical performance data.

9. The method of claim 6, wherein the selections of the plurality of individual seed varieties is by historical growing year, and wherein the processor is used to identify the common set of historical attributes for the historical growing year.

10. The method of claim 6, wherein the attributes comprise National Turf Evaluation Program (NTEP) attributes.

11. A computer-implemented method for predicting performance of individual seed varieties across geographic regions, the method comprising:
using a computer database to store a set of historical performance data for each of a plurality of individual seed varieties, the sets of historical performance data each comprising at least an identity of the individual seed variety, a geographic region in which the grass seed variety was grown, a historical growing year, attributes, and attribute values, wherein a number of attributes or the attribute values differ among the sets; and using a computer processor to:
receive a plurality of selections comprising at least two individual seed varieties and one or more attributes of the seed variety,
wherein the one or more attributes of the seed variety comprises aggressiveness, brown patch, cold tolerance, color, compaction tolerance, dollar spot, drought tolerance, early spring green up, endophyte/insect resistance, fast establishment, height/moving frequency, insect tolerance, leaf spot, leaf texture, low maintenance, low mowing height, mountain west quality, mowing quality, necrotic ring spot, Pacific Northwest quality, quality ratings, red thread, rhizomatous, crown and stem rust, salt tolerance, shade tolerance, shade/powdery mildew, sod-shear strength, summer patch, summer stress, or wear tolerance;
calculate a weighted average for each attribute value for the selected individual seed varieties; and
display a visual interface that includes representations of attribute values for a common set of attributes for the attribute values identified for the at least two individual seed varieties as a prediction of performance of the individual seed, and wherein the representations includes a weighted average for the at least two selected individual seed varieties, wherein the representations include an arrangement of the common set of attributes and corresponding attribute values for the individual seed varieties by each individual attribute of the common set of historical attributes.

12. The method of claim 11, wherein the selections further comprise selections by historical growing year, and wherein the processor is used to identify the common set of historical attributes for the historical growing year.

13. The method of claim 11, wherein the attributes stored using the computer database comprise National Turf Evaluation Program (NTEP) attributes.

14. The method of claim 11, further comprising using the computer processor to:
receive a themed selection, the themed selection representing a group of attributes having commonalities; and identify the common set of attributes from the themed selection.

* * * * *